A. L. PENNOCK.

STEAM GENERATOR.

No. 4,301. Reissued Mar. 14, 1871.

Witnesses;
John Parker
Harry Smith

Inventor;
A. L. Pennock
by his Attys
Howson & Son

2 Sheets—Sheet 2.
A. L. PENNOCK.
STEAM GENERATOR.
No. 4,301. Reissued Mar. 14, 1871.
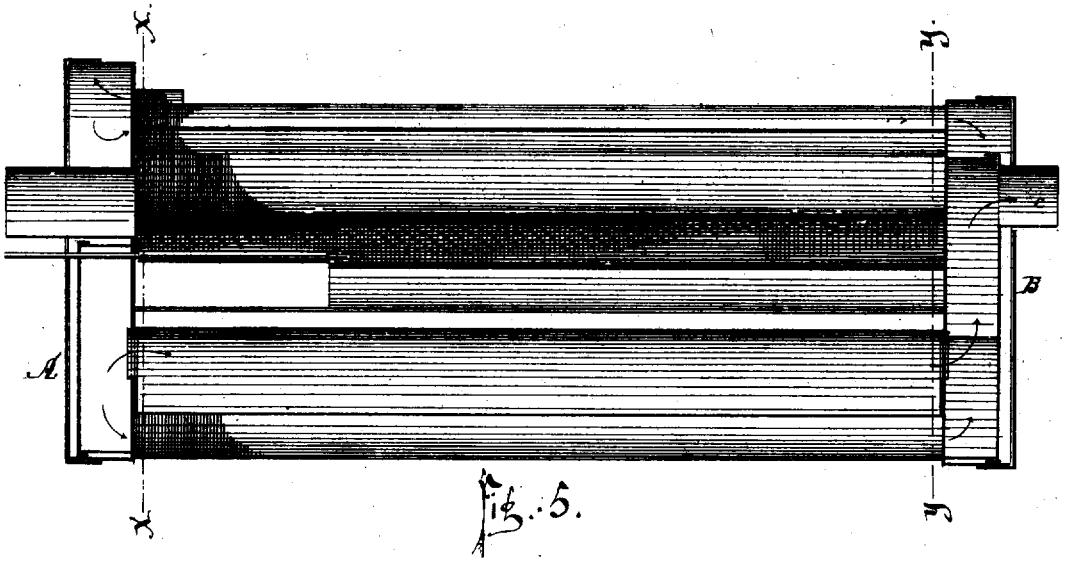
Fig. 5.
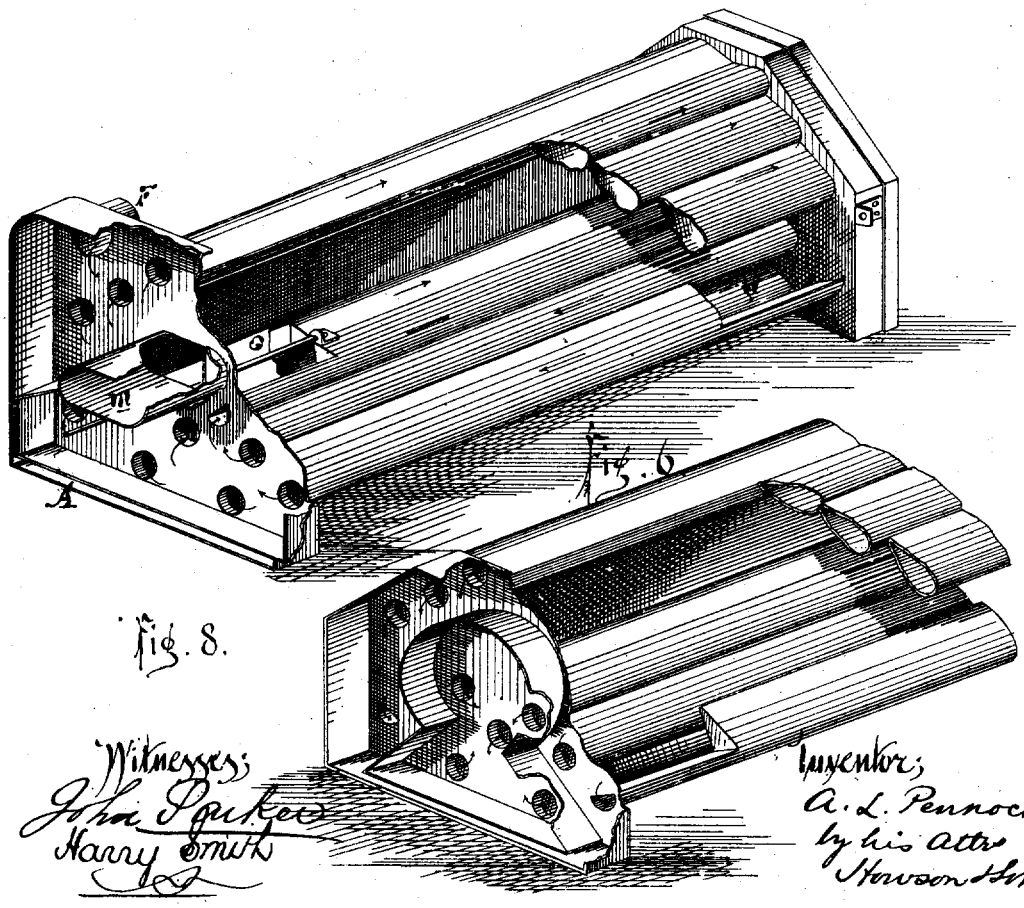
Fig. 6
Fig. 8.
Witnesses;
John Spurkes
Harry Smith
Inventor;
A. L. Pennock
by his attys
Howson & Son

United States Patent Office.

ABRAHAM L. PENNOCK, OF PHILADELPHIA, PENNSYLVANIA.

Letters Patent No. 103,363, dated May 24, 1870, reissue No. 4,301, dated March 14, 1871.

IMPROVEMENT IN STEAM-GENERATORS.

The Schedule referred to in these Letters Patent and making part of the same.

I, ABRAHAM L. PENNOCK, of the city and county of Philadelphia, State of Pennsylvania, have invented an "Improvement in Boilers," of which the following is a specification.

*Nature and Object of the Invention.*

My invention consists of a peculiar mode of constructing the water-circulating tubes of cast-iron boilers, such as are used for heating green-houses, &c., with steam or hot water, the said tubes being made round on one side and tapering or wedge-shaped on the opposite side, with the view of increasing their capacity and readily forming them into partitions for flues, &c.

*Description of the Accompanying Drawing.*

Figure 1:
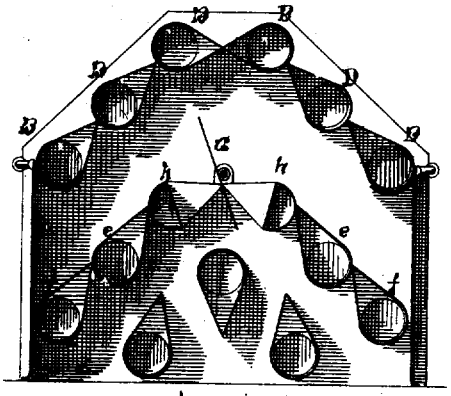
Figure 2:
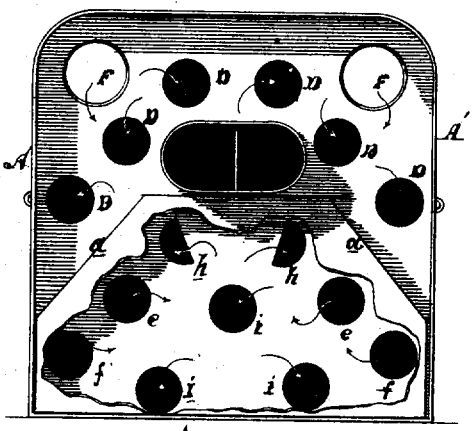
Figure 3:
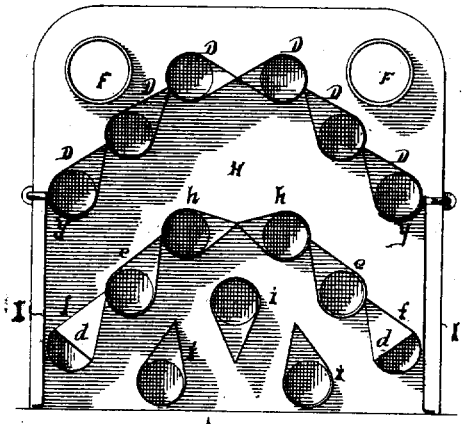
Figure 4:
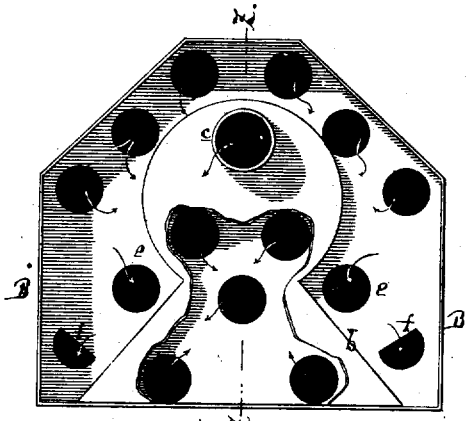
Figure 7:
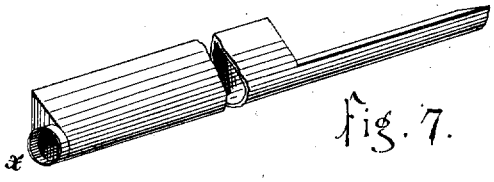

Figure 1 is a transverse vertical section of the boiler on the line *x x*, fig. 5;

Figure 2, a transverse section of the front end of the boiler;

Figure 3, a transverse section on the line *y y*, fig. 5;

Figure 4, a transverse section of the rear end of the boiler;

Figure 5, a longitudinal vertical section;

Figure 6, a sectional perspective view, looking toward the front of the boiler;

Figure 7, a perspective view of one of the tubes; and

Figure 8, a sectional perspective view, looking toward the rear of the boiler.

*General Description.*

A is the front chamber, and

B the rear chamber of the boiler, the two chambers being of quadrangular or other suitable form, and connected together by a system of tubes, the peculiar character of which will be fully explained hereafter.

The front chamber A is separated into two compartments by a partition, *a*, fig. 2, so that the cold water which enters the upper compartment of the said chamber through pipes F F must pass to the rear chamber through the upper row of tubes D D, &c.; and this rear chamber has a partition, *b*, fig. 4, so arranged that the water admitted to it must return through tubes *e e* and *f f* to the lower compartment of the front chamber, to pass thence through the tubes *h h* and *i i* to the lower compartment of the rear chamber B, whence the water and steam escape, through the branch *c*, to the distributing-pipes.

It will be observed, on reference to figs. 1, 3, and 7, that the above-described tubes, through which the water circulates, and which connect the two chambers A and B together, are of a peculiar form, each tube being rounded on one side and tapering or wedge-shaped on the other; or, viewed transversely, as in figs. 1 and 3, the tubes are of a pear-shape, and this shape is preserved throughout the entire length of each tube, excepting at the circular ends *x*, fig. 7, where the tubes fit in the chamber, and excepting where portions of the tubes are cut away for a purpose explained hereafter.

The upper row of tubes D D, &c., are arranged in relation to each other, as shown in figs. 1 and 3, so as to form the roof of the boiler, between which and a like partition, formed by the lower row of tubes *f f e e h h*, intervenes a flue, H, the sides of the latter consisting of plates I I.

The fire-place is situated beneath the boiler, at the front end of the same, and the products of combustion envelop the lower tubes *i i i*, and pass beneath the partition formed by the tubes *f f e e h h*, and thence upward through openings *d*, made in the said partition by cutting away a portion of each lower tube *f*, as seen in fig. 7, thence into the flue H, beneath the two rows of tubes, and, after traversing this flue, escape through the escape-pipe *m* to the chimney.

Immediately above the fire-place there is an opening in the partition formed by the lower series of tubes, and in this opening is arranged a damper, G, fig. 8, so that in kindling the fire in the first instance the products of combustion may, on opening this damper, be caused to pass directly to the exit-pipe instead of taking the course described above.

This opening is made by cutting away portions of two adjoining tubes, *h h*, as shown in fig. 7. It should be understood that in thus cutting away the tubes they do not cease to be mediums for the circulation of water, the ends of the tubes thus cut away being simply semicircular, as shown at *h h*, fig. 2, and *f f*, fig. 4, the semicircular ends being fitted to similarly-shaped openings in the end chambers of the boiler.

The plates I I, fig. 3, have at their upper edges internal curved flanges or troughs *y y*, adapted to the under side of the end tubes D D of the upper row, these troughs being filled with sand or other equivalent material, so as to form tight joints.

The main feature of my invention, however, consists of the peculiar formation of the tubes employed in the construction of the boiler, these tubes being rounded on one side and reduced to a sharp or nearly sharp edge on the opposite side, or presenting, when viewed transversely, the pear-shape clearly shown in figs. 1 and 3.

These tubes afford two prominent advantages: first, their capacity for the circulation of water is increased, as is also their heating surface; and, secondly, owing to their shape, they can be readily formed into partitions of any desired shape, either by causing the sharp edges of two adjoining tubes to meet or slightly overlap each other, or by causing the sharp edge of one tube to bear against the rounded side of an adjoining tube, both of which plans are adopted in forming the partitions shown in figs. 1 and 3. This mode of forming the tubes into partitions can be accomplished without any fitting, the simple turning of one tube in its bearing, until its sharp edge bears against the adjoining tube, being all that is necessary to produce a joint of sufficient tightness for the roof or flue of the boiler.

It may be remarked, moreover, that, owing to the simple form of the tubes, they can be easily and cheaply cast, and, owing to their circular ends, readily fitted to their places.

Another advantage resulting from the use of tubes having an elongated transverse section and eccentric axes, and attached to the plates, is, that one tube may be made to overlap the other, so that a sufficiently tight joint is always secured should the position of the openings into which the circular ends of the tubes extend be slightly varied, the rounding of one edge of the tube enabling this adjustment to be more easily effected.

The facility with which openings can be made in the partitions by stopping off portions of the tubes has been explained above.

Although I have illustrated and described a boiler of peculiar shape, such a boiler, for instance, as may be used for circulating hot water and steam through green-houses, &c., my invention may be applied to different styles of boilers.

*Claims.*

1. A boiler, in which a partition or partitions is formed by circulating-tubes, constructed substantially as described, and supported between the ends of the boiler so that they may be turned to bring their edges against the adjacent tubes, substantially as specified.

2. A partition, consisting of circulating tubes, each rounded at one edge, and bearing with its opposite edge against, or overlapping, the adjacent tube, as specified.

In testimony whereof I have signed my name to this specification in the presence of two subscribing witnesses.

ABRAHAM L. PENNOCK.

Witnesses:
WM. A. STEELE,
F. B. RICHARDS.